United States Patent [19]

Tsutsumi et al.

[11] Patent Number: 4,642,274

[45] Date of Patent: Feb. 10, 1987

[54] FUEL CELL SYSTEM

[75] Inventors: Masaru Tsutsumi, Hyogo; Hideo Hagino, Otsu; Osamu Fujiwara, Takasago; Hitoshi Goto, Hirakata, all of Japan

[73] Assignee: Sanyo Electric Co., Ltd., Moriguchi, Japan

[21] Appl. No.: 796,333

[22] Filed: Nov. 12, 1985

[30] Foreign Application Priority Data

Nov. 12, 1984 [JP] Japan .................. 59-238113

[51] Int. Cl.⁴ ........................................... H01M 8/04
[52] U.S. Cl. ......................................... 429/35; 429/37
[58] Field of Search ............... 429/35, 34, 36, 37, 429/38

[56] References Cited

U.S. PATENT DOCUMENTS 3,320,092  5/1967  Uline ............................. 429/38 X
3,589,941  6/1971  Eaton et al. .................... 429/38 X
4,467,018  8/1984  Schroll .......................... 429/35 X
4,508,793  4/1985  Kumata et al. ................. 429/35 X Primary Examiner—Anthony Skapars
Attorney, Agent, or Firm—Armstrong, Nikaido Marmelstein & Kubovcik

[57] ABSTRACT

Means for forming a seal between a fuel cell stack and manifolds to be fixed to respective sides of the fuel cell stack that comprises rigid frames adapted to be fixed on each side of the fuel cell stack and provided at its peripheries with grooves extending in the stacked direction of the fuel cell components and fastening means for uniting said frames. Each of fastening means comprises a pair of angle members each having a hook at its one end and being preassembled together with elastic washers by a clamping bolt and a nut. The hooks of the angle members of each pair is adapted to be engaged with the grooves of the adjacent frames.

4 Claims, 4 Drawing Figures

FUEL CELL SYSTEM

BACKGROUND OF THE INVENTION

1. Field of the invention

This invention relates to a fuel cell system and, more particularly, to a means for forming a seal between a fuel cell stack and manifolds to be fixed to respective sides of the fuel cell stack.

2. Description of the Prior Art

In a fuel cell system, manifolds are sealingly fixed to sides of a fuel cell stack with bolts. Sealing members are sandwiched between the peripheries of the sides of the fuel cell stack and flanges of the manifolds to form a seal between them. However, the manifolds are fastened only at their upper and lower portions of the flange to the sides of the top and bottom plates of the stack with the bolts. Thus, it is difficult to avoid unevenness of fastening force acting on the sealing member. For this reason, the sealing members extending in the stacked direction of the fuel cell units may loose their sealing function, resulting in a leakage of the gas from the manifolds.

To solve this problem, one of the inventors of the present invention, H. Hagino has proposed together with H. Ide and Y. Miyake, in Japanese patent application laid-open No. 58-197679, to use rigid frames 3 for sealingly fixing manifolds 9 to sides of the fuel cell stack 1, as shown in FIGS. 3 and 4. In such fuel cell system, the fuel cell stack 1 is provided with sealing members 2 at peripheries of its sides and tightly fastened by rigid frames 3 interconnected by bolts 4 and strips 5 mounted at their sides. When assembling this system, bolts 4 fixed at one end of the sides of the frame 3 are engaged at the other end with strips 5 mounted on one side of the adjacent frame 3 and fastened with a spring 6 and a nut 7. The manifolds 9 are sealingly fixed to the frames 3 with screws 10. Arranged between the frames 3 and the manifolds 9 are gaskets 8 to form a seal between them. Since the fuel cell stack 1 is uniformly fastened by the frames 3, a uniform force is applied to every part of the sealing members 2. Also, a uniform force is applied to every part of the gaskets 8 since the manifolds is fastened at its flange with screws along its whole circumference. Thus, it is possible to prevent a leakage of the gas from the system.

However, in such a construction is troublesome to assemble the fuel cell system since the bolts 4 mounted on the sides of one frame must be engaged with strips 5 mounted on the sides of the adjacent frame 3. Also, if any strip or bolt is damaged, it is impossible to tighten the frames uniformly, making it difficult to achieve the uniform and complete sealing between the fuel cell stack 1 and the frame 3. This results in the lowering and ununiformity in the fuel cell characteristics. In addition, the strips and bolts have a realatively long length, so that they cause disadvantages in the system design and in size.

Accordingly, it is an object of the present invention to provide a fuel cell system which overcomes the aforesaid disadvantages.

Another object of the present invention is to provide means for forming a seal between a fuel cell stack and manifolds to be fixed to sides of the fuel cell stack.

SUMMARY OF THE INVENTION

According to the present invention, there is provided means for forming a seal between a fuel cell stack and manifolds to be fixed to respective sides of the fuel cell stack comprising rigid frames adapted to be fixed on each side of the fuel cell stack and provided at the peripheries with grooves extending in the stacked direction of the fuel cell components and fastening means for uniting the frames. Each of fastening means includes a pair of angle members each having a hook at its one end and being combined by a clamping bolt and a nut. The hooks of the angle members of each pair are engaged with the grooves of the adjacent frames.

According to the present invention there is provided a fuel cell system comprising a fuel cell stack, manifolds for process gases and cooling gas fixed to sides of the fuel cell stack, and means for forming a seal between the fuel cell stack and said manifolds. The sealforming means comprising rigid frames to which manifolds are sealingly fixed, and a plurality of fastening means each comprising a pair of angle members and a clamping bolt, each of the frames being provided at its periphery with grooves extending in the stacked direction of the fuel cell components and being united and fixed to sides of the fuel cell stack by fastening means. The angle members of each pair have a pair of hooks engaged with the grooves of the adjacent frames and are clamped by the clamping bolt.

BRIEF DESCRIPTION OF THE DRAWINGS

These and other objects, features and advantages of the present invention will be more apparent from the following description taken in connection with the accompanying drawings, in which.

DETAILED DESCRIPTION OF THE INVENTION

Figure 1:
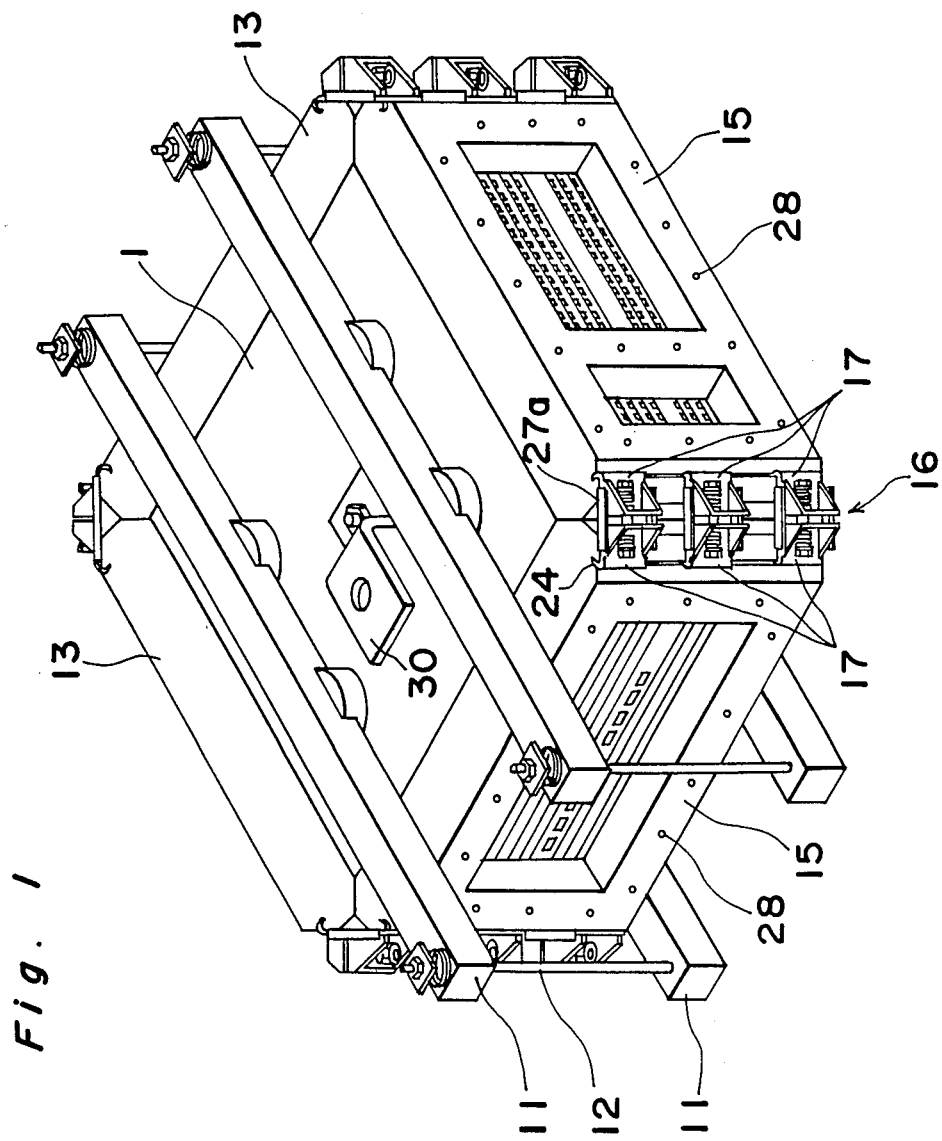
FIG. 1 is a schematic perspective view of a fuel cell system according to the present invention.

Referring now to FIG. 1, there is shown a fuel cell system according to the present invention comprising a fuel cell stack 1, inlet and outlet manifolds (not illustrated in FIG. 1) mounted on pairs of opposite sides of the stack, and means 14 for forming a seal between the fuel cell stack 1 and the manifolds. The stack is fastened tight with tie bars 11 and tie rods 12.

The seal-forming means 14 comprises frames 15 to which a manifold is sealingly affixed, and preassembled fastening means 16 including a pair of angle members 17 and a clamping bolt 18. Preferably, each of the frames 15 is a rigid molding of a metal such as aluminium. The frame 15 has an opening 15a and is provided with grooves 19 along peripheries of its vertical sides to receive hooks 24 of the fastening means 16. Sealing members 20, 21 and 22 are mounted in front and rear faces of each frame 15 to form a seal between the stack 1 and the frame 15 and between the frame 15 and manifold.

Figure 2:
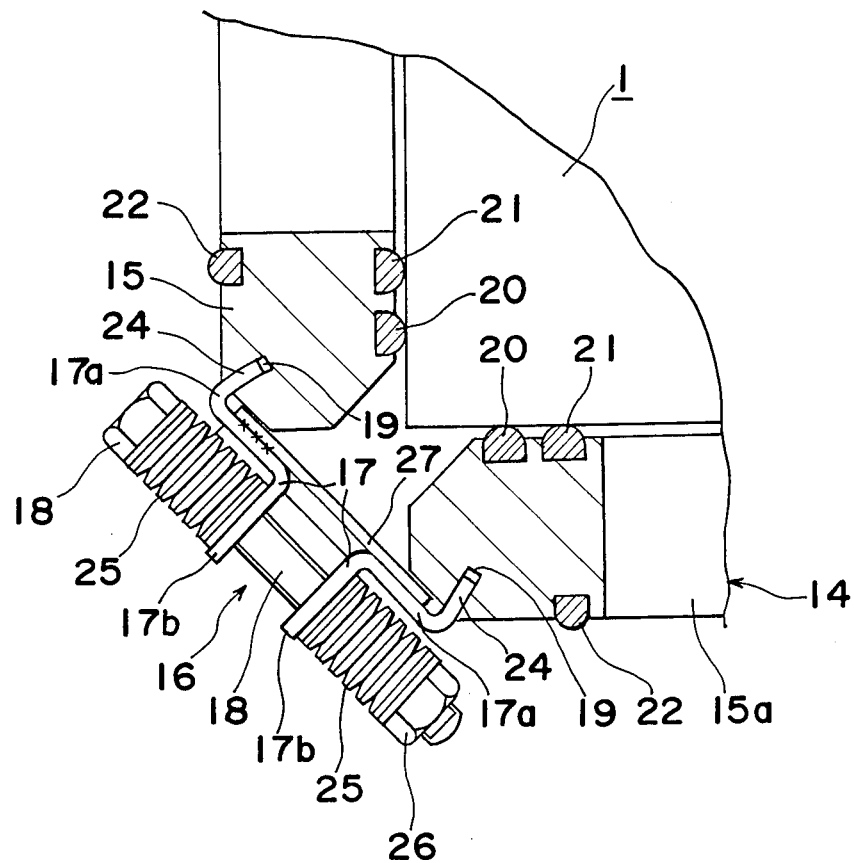
FIG. 2 is a cross sectional plan view of a selected portion of the fuel cell system of FIG. 1.

The fastening means 16 comprises a pair of connecting angle members 17 having a hook 24 at the end of its leg 17a and is preassembled together with elastic washers 25 by a clamping bolt 18 and nut 26. The elastic washers 25 mounted on the bolt 18 are respectively arranged between the head of the bolt 18 and the angle member 17 and between the other angle member 17 and the nut 26 to force the pair of angle members. One of the angle members 17 of each pair is provided with a guide plate 27 by welding as illustrated by the symbols xxx in FIG. 2, while the other angle member 17 is slidably mounted on the guide plate 27. The other angle member 17 is moved along the guide plane and ribs 27a of the guide plate 27 by tightening with nut 26.

The fuel cell system of the instant invention is assembled in such a manner that the frames 15 are applied to respective sides of the fuel cell stack 1 and then connected to each other with the preassembled fastening means 16 by hooking the hooks of the angle members 17 of each pair to the grooves 19 provided in the adjacent frames 15 and then retightening the nut 26. Since the frames 15 are connected to tightly each other, they are sealingly fixed to the fuel cell stack 1. The sealing between the stack 1 and the frames 15 is achieved by sealing members 20 and 21. Manifolds are then fixed to the frames 15 by engaging screws into threaded holes 28 provided in the frames 15. Sealing between the frames 15 and the manifolds is achieved by sealing members 22. A reference numeral 30 shows an external mounting terminal.

Figure 3:
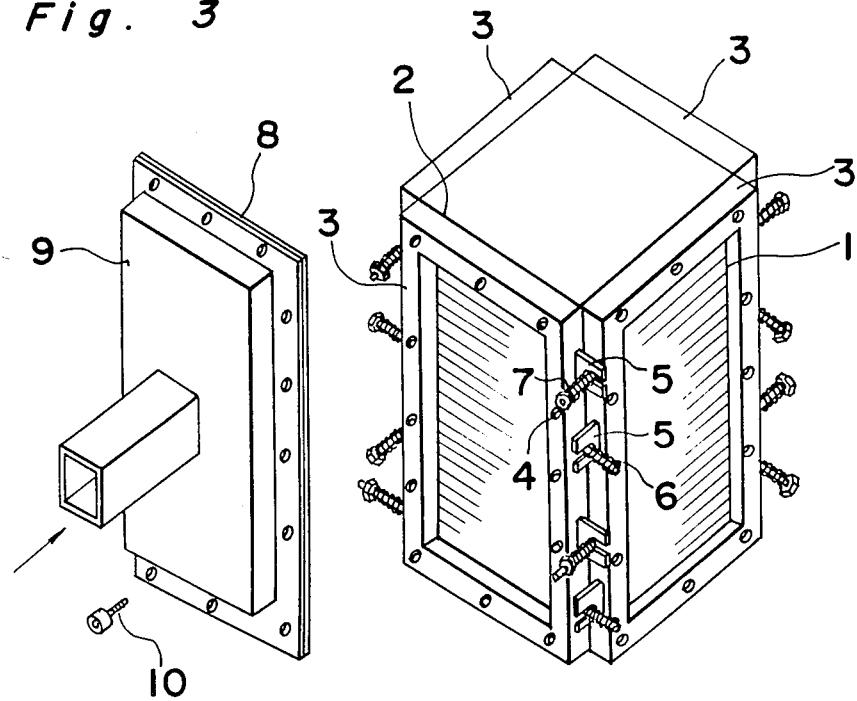
FIG. 3 is a schematic perspective view of a fuel cell system of the prior art, with a manifold being removed.
Figure 4:
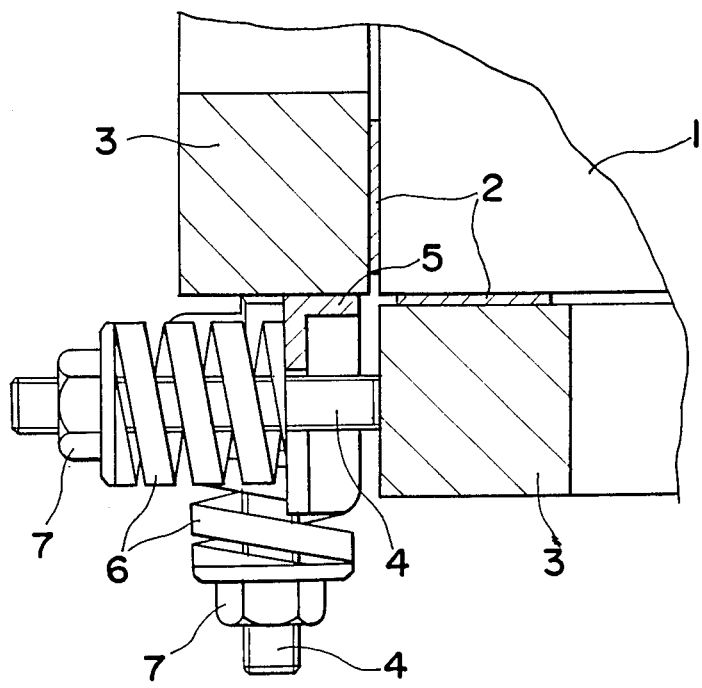
FIG. 4 is a cross sectional plan view of selected portions of the fuel cell system of FIG. 3.

According to the present invention, it is possible to assemble frames to which manifolds are sealingly fixed with ease because there are no strips and bolts at their sides as shown in FIGS. 3 and 4. The frames are connected with preassembled fastening means. Since the fastening means are attached to the frames only by hooking the the angle members of each pair to the grooves of the adjacent frames and then retightening the nut, it is possible to connect the adjacent frames at any point with any number of fastening means. Thus making it possible to improve sealing between the fuel cell stack and the frames is improved. Also, this sealing structure allows for a more simple frame structure and a small sized fuel cell system.

What is claimed is:

1. A fuel cell stack and manifolds sealing system comprising rigid frames provided at their peripheries with grooves extending in the stacked direction of the fuel cell components and fastening means for uniting said frames, each said fastening means comprising a pair of angle members each having a hook at its one end and being preassembled with elastic washers and a clamping bolt extending through said pair of angle members and said washer and a nut on said bolt, said hooks of the angle members of each pair engaging the grooves of the adjacent frames.

2. Means according to claim 1 wherein one of the angle members of each said pair of angle members is provided with a guide plate for guiding the other angle member of said pair.

3. A fuel cell system comprising a fuel cell stack having manifolds for process gases and cooling gas fixed to sides of said fuel cell stack and means for forming a seal between said fuel cell stack and said manifolds, said sealforming means comprising rigid frames for sealingly fixing manifolds to said fuel cell, and a plurality of fastening means each comprising a pair of angle members and a clamping bolt, each of said frames having at its periphery a groove extending in the stacked direction of the fuel cell components and being united and fixed to sides of the fuel cell stack by said fastening means, said angle members of each pair having a pair of hooks engaged with said grooves of the adjacent frames, said angle members and said frames being clamped by the clamping bolt.

4. A fuel cell stack and manifolds sealing system as recited in claim 1, wherein sealing members are mounted in front and rear faces of each frame to form seals between the side of the stack and the frame and between the frame and the manifold.

* * * * *